(No Model.)

J. H. KAMERER.
TABLE WAITER.

No. 321,977. Patented July 14, 1885.

Attest.
John C. Perkins
John H. Chase

Inventor.
John H. Kamerer
By Lucius C. West
Atty.

N. PETERS, Photo-Lithographer, Washington, D. C.

UNITED STATES PATENT OFFICE.

JOHN H. KAMERER, OF PLAINWELL, MICHIGAN, ASSIGNOR OF ONE-HALF TO WILLIAM OLIVER, OF SAME PLACE.

TABLE-WAITER.

SPECIFICATION forming part of Letters Patent No. 321,977, dated July 14, 1885.

Application filed September 12, 1884. (No model.)

*To all whom it may concern:*

Be it known that I, JOHN H. KAMERER, a citizen of the United States, residing at Plainwell, county of Allegan, State of Michigan, have invented a new and useful Table-Waiter, of which the following is a specification.

This invention has for its object certain improvements, hereinafter described, and pointed out in the claims.

Figure 1:
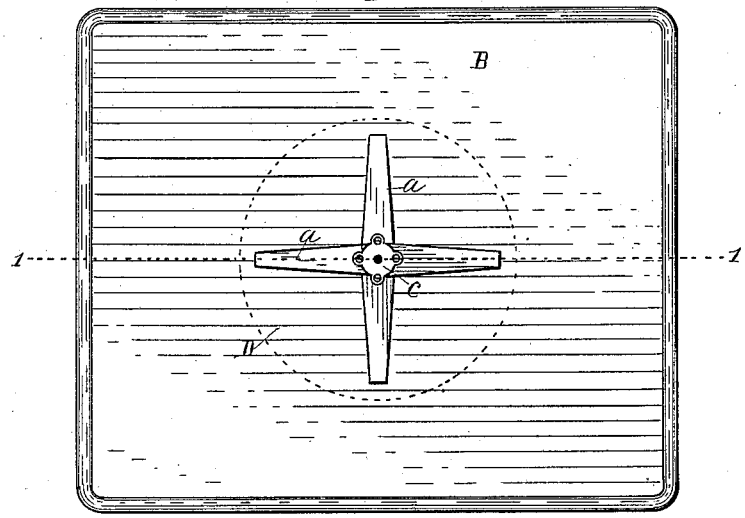
Figure 2:
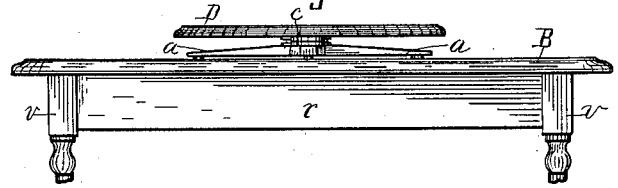
Figure 3:
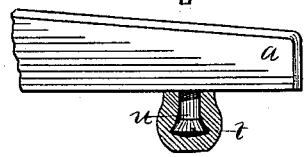
Figure 4:
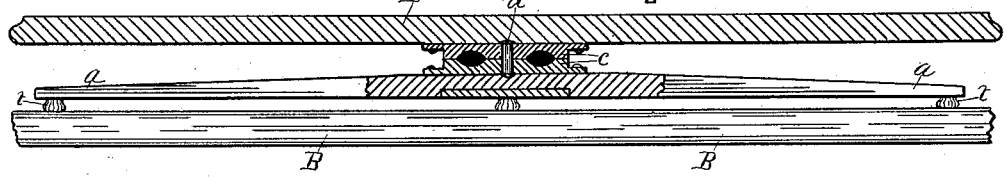
Figure 5:
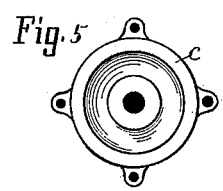

In the drawings forming a part of this specification, Figure 1 is a top view of dining-table, showing location of waiter; Fig. 2, a side elevation of the waiter and table; Fig. 3, an enlarged broken detail of the waiter, partly in section; Fig. 4, an enlarged broken view of Fig. 2, portions being in section on line 1 1 in Fig. 1; and Fig. 5 is an enlarged plan of a detail of the waiter.

The revoluble waiter-top D is provided with a support consisting of four (more or less) arms, *a a*, radiating from the center pivot, *d*. These arms detachably rest upon the table B at any desired position. The arms *a a* and waiter-top D are provided on their contiguous surfaces at the center with bearing-plates *c c*, secured to them. The plates are centrally perforated and provided with a pivot, *d*, Fig. 4. The pivot *d* is headed at each end, said heads being located in sockets in the arms and waiter-top made to receive them. By this means the waiter-top is made revoluble, the upper plate turning on the lower plate around the pivot *d*.

In the use of the waiter the food is placed thereon, and the guests sitting around the table B turn the waiter, bringing such food in their reach as they desire. By the waiter being thus detachably placed on the table, it may be readily removed and the table be used for other purposes; and any table now in use may be utilized upon which to place the waiter. The arms *a a*, at the outer ends, are provided with buds or supports *t t*, by which means any unevenness of the table B will not cause the waiter to sit uneven and tilt or joggle. I prefer to make the buds *t t* of screws *u*, covered with rubber caps, by which means the table is not scratched or marred; and by turning the screws in or out of the arms the waiter may be adjusted to sit level on a slanting table.

I am aware that revoluble table-tops and shelves having a base to which they are pivoted have been devised prior to my construction, and also that different devices have been provided with buds or short leg-supports; but I have effected valuable improvements, claimed below.

Having thus described my invention, what I claim as new, and desire to secure by Letters Patent, is—

1. A table-waiter consisting of the radial-armed base, the waiter-top, and the pivotally-connected bearing-plates secured on the under side of the waiter and on the upper side of the base, substantially as set forth.

2. A table-waiter consisting of the radial-armed base for detachable location on a dining-table, the adjustable buds on the under side of the free ends of the base-arms, the waiter-top, and the pivotally-connected bearing-plates between the top and base, substantially as set forth.

In testimony of the foregoing I have hereunto subscribed my name in presence of two witnesses.

JOHN H. KAMERER.

Witnesses:
 BENJAMIN F. RIX,
 JOHN H. CHASE.